United States Patent
Olim

(10) Patent No.: US 7,230,796 B2
(45) Date of Patent: Jun. 12, 2007

(54) FEATURES FOR IMPROVED SLIDER ATTACHMENT

(75) Inventor: Moshe Olim, Eden Prairie, MN (US)

(73) Assignee: Seagate Technology LLC, Scotts Valley, CA (US)

(*) Notice: Subject to any disclaimer, the term of this patent is extended or adjusted under 35 U.S.C. 154(b) by 461 days.

(21) Appl. No.: 10/684,798

(22) Filed: Oct. 14, 2003

(65) Prior Publication Data

US 2005/0078414 A1    Apr. 14, 2005

(51) Int. Cl.
*G11B 21/16* (2006.01)

(52) U.S. Cl. .................................. 360/234.6

(58) Field of Classification Search ............. 360/234.6, 360/245.4
See application file for complete search history.

(56) References Cited

U.S. PATENT DOCUMENTS

| | | | |
|---|---|---|---|
| 4,700,250 A | 10/1987 | Kuriyama | 360/234.6 |
| 5,021,907 A | 6/1991 | Zak | 360/234.6 |
| 5,223,997 A * | 6/1993 | Uemura et al. | 360/234.6 |
| 5,381,288 A * | 1/1995 | Karam, II | 360/245 |
| 5,644,450 A * | 7/1997 | Handa | 360/246.6 |
| 5,712,748 A | 1/1998 | Masse | 360/245.3 |
| 5,734,523 A | 3/1998 | Scheidecker et al. | 360/234.5 |
| 5,786,961 A | 7/1998 | Goss | 360/245.1 |
| 5,864,446 A * | 1/1999 | Endo et al. | 360/244.6 |
| 5,880,908 A | 3/1999 | Shiraishi et al. | 360/234.6 |
| 6,036,813 A | 3/2000 | Schulz et al. | 156/307.7 |
| 6,078,472 A | 6/2000 | Mitoh et al. | 360/245.4 |
| 6,459,549 B1 | 10/2002 | Tsuchiya et al. | 360/245.9 |
| 6,552,875 B1 | 4/2003 | Le et al. | 360/234.6 |
| 6,700,746 B1 * | 3/2004 | Brandt et al. | 360/245.4 |
| 2002/0030940 A1 | 3/2002 | Kamigama et al. | 360/245.9 |
| 2003/0005574 A1 | 1/2003 | Kasajima et al. | 29/603.6 |
| 2005/0157425 A1 * | 7/2005 | Walter et al. | 360/234.6 |

* cited by examiner

*Primary Examiner*—Julie Anne Watko
(74) *Attorney, Agent, or Firm*—Leanne R. Taveggia; Westman, Champlin & Kelly, P.A.

(57) ABSTRACT

A slider for supporting at least one transducer includes a slider body having a bearing surface and an opposing mounting surface. The slider also includes at least one adhesive control feature formed on the mounting surface to increase a surface area on which an adhesive is deposited.

8 Claims, 5 Drawing Sheets

FEATURES FOR IMPROVED SLIDER ATTACHMENT

FIELD OF THE INVENTION

The present invention relates generally to data storage systems. In particular, the present invention relates to sliders for carrying transducers.

BACKGROUND OF THE INVENTION

A typical disc drive includes a housing that encloses a variety of disc drive components. The components include one or more rotating discs having data surfaces that are coated with a medium for storage of digital information in a plurality of circular, concentric data tracks. The discs are mounted on a spindle motor that causes the discs to spin. Sliders carry transducers, which write information to and read information from the data surfaces of the discs. The slider and transducer are often together referred to as the "head." An actuator mechanism moves the heads from track to track across the surfaces of the discs under control of electronic circuitry. The actuator mechanism includes a track accessing arm and a suspension for each slider. The suspension includes a load beam and a gimbal. The load beam provides a preload force, which forces the slider toward the disc surface. The gimbal is positioned between the slider and the load beam, or is integrated in the load beam, to provide a resilient connection that allows the slider to pitch and roll while following the topography of the disc.

The slider includes a slider body having a leading edge, a trailing edge and an air bearing surface (ABS) which faces the disc surface. As the disc rotates, the disc drags air under the slider along the air bearing surface, which creates a hydrodynamic lifting force that causes the slider to lift and fly above the disc surface. The transducer is typically mounted at or near the trailing edge of the slider.

Generally, the slider is attached to the gimbal with an adhesive droplet deposited on the back surface of the slider, which is opposite the ABS. Current equipment, for depositing an adhesive droplet on the slider body, is designed to deposit a predetermined size of adhesive. This predetermined size is large enough to detrimentally change the shape of the slider body causing the slider body to perform improperly. In addition, the adhesive tends to spread to the edges of the slider and interferes with sensitive areas on the slider. For example, the adhesive droplet can interfere with the transducer. In some cases, reducing the size of the droplet of adhesive would eliminate these problems. However, current equipment deposits the smallest adhesive droplet as possible. Further development and modifications to the current equipment are unknown and would be costly.

Embodiments of the present invention provide solutions to these and other problems, and offer other advantages over the prior art.

SUMMARY OF THE INVENTION

The present invention is directed towards a slider for supporting at least one transducer. The slider includes a slider body having a bearing surface and an opposing mounting surface. The slider also includes at least one adhesive control feature formed on the mounting surface of the slider body to increase a surface area on which an adhesive is deposited.

In one embodiment, the adhesive control feature is at least one reservoir that is configured to receive at least a portion of the adhesive. The at least one reservoir effectively reduces a size of the adhesive deposited on the mounting surface.

In another embodiment, the at least one reservoir includes at least one island which protrudes from a bottom surface of the at least one reservoir towards the mounting surface of the slider body.

In yet another embodiment, the adhesive control feature is at least one pillar which protrudes from the mounting surface of the slider body in a direction generally away from the bearing surface.

Other features and benefits that characterize embodiments of the present invention will be apparent upon reading the following detailed description and review of the associated drawings.

BRIEF DESCRIPTION OF THE DRAWINGS

FIG. 3-1 is a top plan view of a slider in accordance with an embodiment of the present invention.
FIG. 3-2 is a section view of the embodiment illustrated in FIG. 3-1 in which portions are cross-hatched.
FIG. 4-1 is a top plan view of a slider in accordance with an embodiment of the present invention.
FIG. 4-2 is a section view of the embodiment illustrated in FIG. 4-1 in which portions are cross-hatched.
FIG. 5-1 is a top plan view of a slider in accordance with an embodiment of the present invention.
FIG. 5-2 is a section view of the embodiment illustrated in FIG. 5-1 in which portions are cross-hatched.

DETAILED DESCRIPTION OF ILLUSTRATIVE EMBODIMENTS

Figure 1:
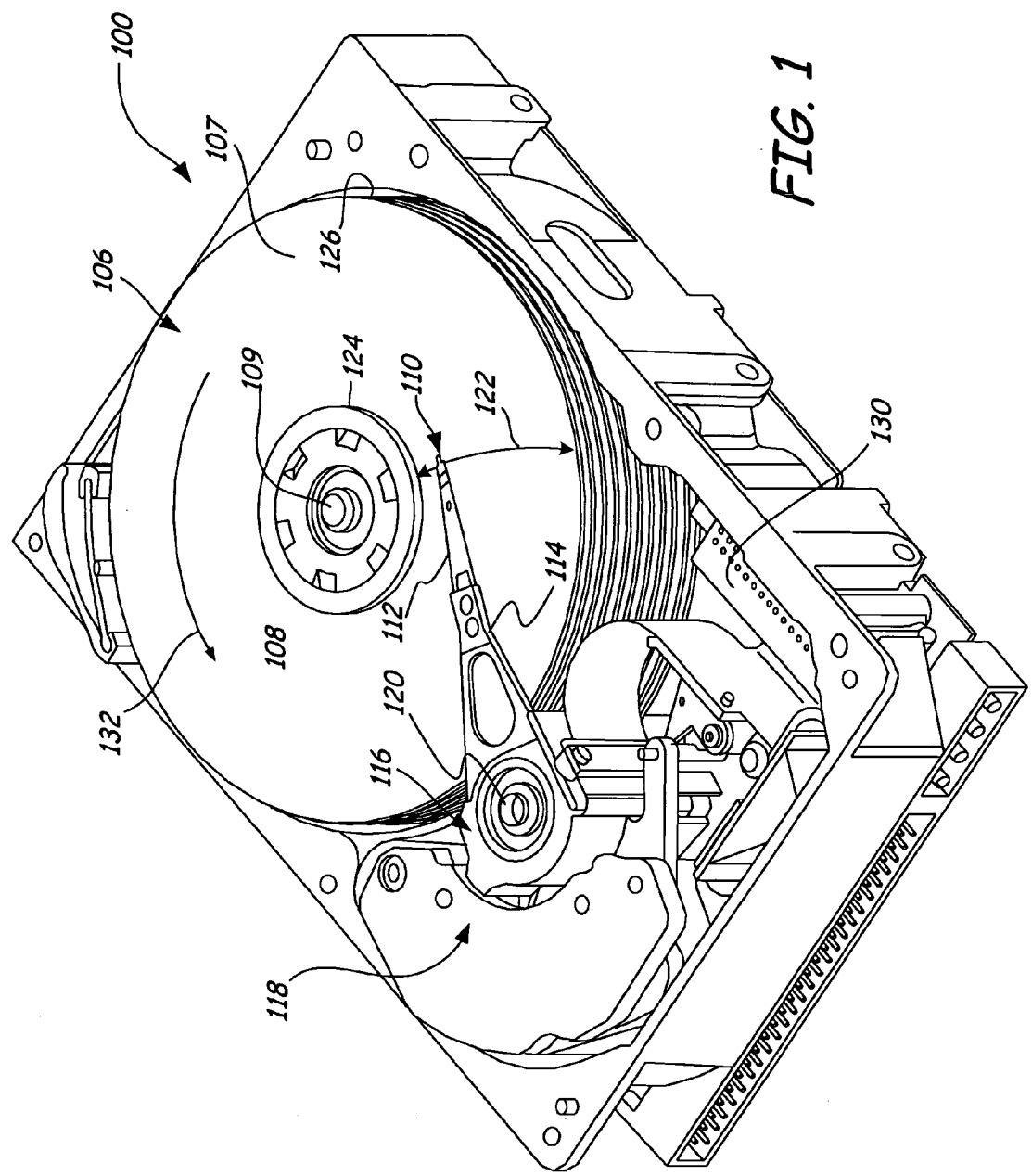
FIG. 1 is a perspective view of a disc drive.

FIG. 1 is a perspective view of a disc drive 100 in which embodiments of the present invention are useful. Disc drive 100 includes a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110, which carries a transducer for communication with the disc surface.

Each slider 110 is attached to a gimbal and supported by a suspension 112. The gimbal is positioned between slider 110 and suspension 112. In turn, suspension 112 is attached to a track accessing arm 114 of an actuator mechanism 116. Actuator mechanism 116 is rotated about a shaft 120 by a voice coil motor 118, which is controlled by servo control circuitry within internal circuit 130. As voice coil motor 118 rotates actuator mechanism 116, sliders 110 move in an arcuate path 122 between a disc inner diameter 124 and a disc outer diameter 126.

During operation, as discs 107 rotate in a rotational direction 132, the discs 107 drag air (or other fluid) under the respective sliders 110 and along their bearing surfaces. As air passes beneath the bearing surfaces, air compression along the air flow path causes the air pressure between the disc 107 and the bearing surfaces to increase, which creates an aerodynamic lifting force that counteracts the preload force provided by suspension 112. The aerodynamic lifting force that counteracts the preload force causes the sliders 110 to lift and fly above, but in close proximity to the disc surfaces. Alternatively, sliders 110 can operate in direct contact with the disc surfaces. While FIG. 1 illustrates one manner of actuating the data head proximate a data storage medium, the present invention, however, is applicable to systems that use other actuation techniques, such as a linear actuator.

Figure 2:
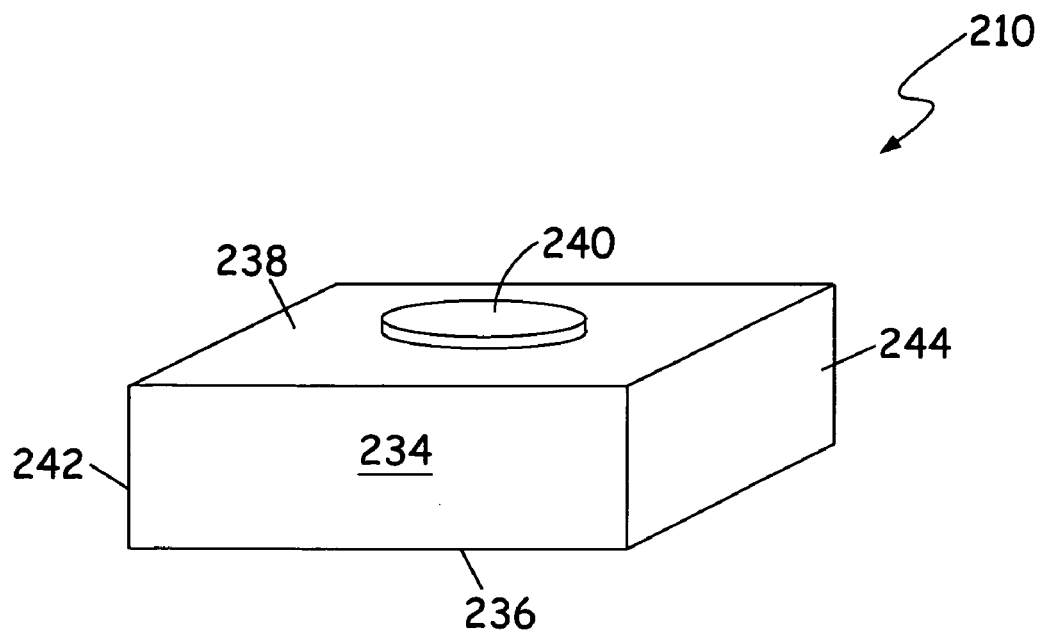
FIG. 2 is a perspective view of a slider in accordance with the prior art.

FIG. 2 is a perspective view of slider 210 in accordance with the prior art. Slider 210 is configured for incorporation into a disc drive. For example, slider 210 can be substituted for slider 110 as shown in FIG. 1. Slider 210 includes slider body 234, which has bearing surface 236, mounting surface 238, trailing edge 242 and leading edge 244. Bearing surface 236 is the disc-facing surface and mounting surface 238 is the surface that is mounted to a gimbal positioned between slider 210 and a suspension, such as suspension 112. A disc, such as disc 107, rotates relative to slider body 234 at least partially in a direction from leading edge 244 to trailing edge 242. Read/write transducers are carried on trailing edge 242 of slider body 234 for reading data from disc 107 and writing data to disc 107.

Typically, slider 210 is attached to the gimbal with an adhesive droplet 240. Adhesive droplet 240 is deposited on the mounting surface 238 of slider 210. The predetermined size of adhesive droplet 240 is an amount large enough to detrimentally change the shape of slider body 234. Upon normal thermal expansion of slider body 234, the deposited amount of adhesive causes slider 210 to perform improperly. In addition, adhesive droplet 240 tends to spread towards the edges of slider body 234 and can interfere with sensitive areas on the slider 210, such as the read/write transducers. In some cases, reducing the size of adhesive droplet 240 which is deposited on mounting surface 238 would eliminate this problem. However, current equipment used for depositing the adhesive droplet 240 on mounting surface 238 deposits the smallest adhesive droplet possible. Thus, further development and modifications to the current equipment would be costly.

Mounting surface 238 of slider 210 is not optimized for controlling adhesion. Thus, to eliminate adhesive droplet 240 from causing slider body 234 to improperly perform as well as to control the deposition location of adhesive droplet 240, the present invention is a slider body including at least one adhesive control feature formed on a mounting surface of the slider body to increase a surface area on which an adhesive is deposited.

Figures 1, 3:
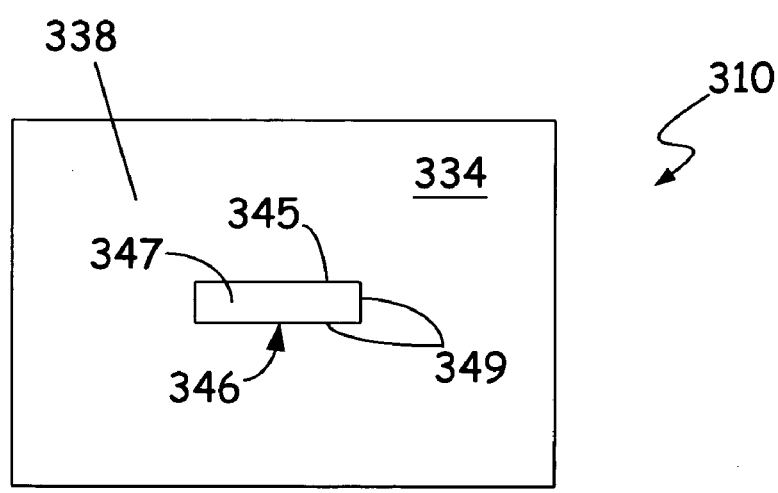
Figures 2, 3:
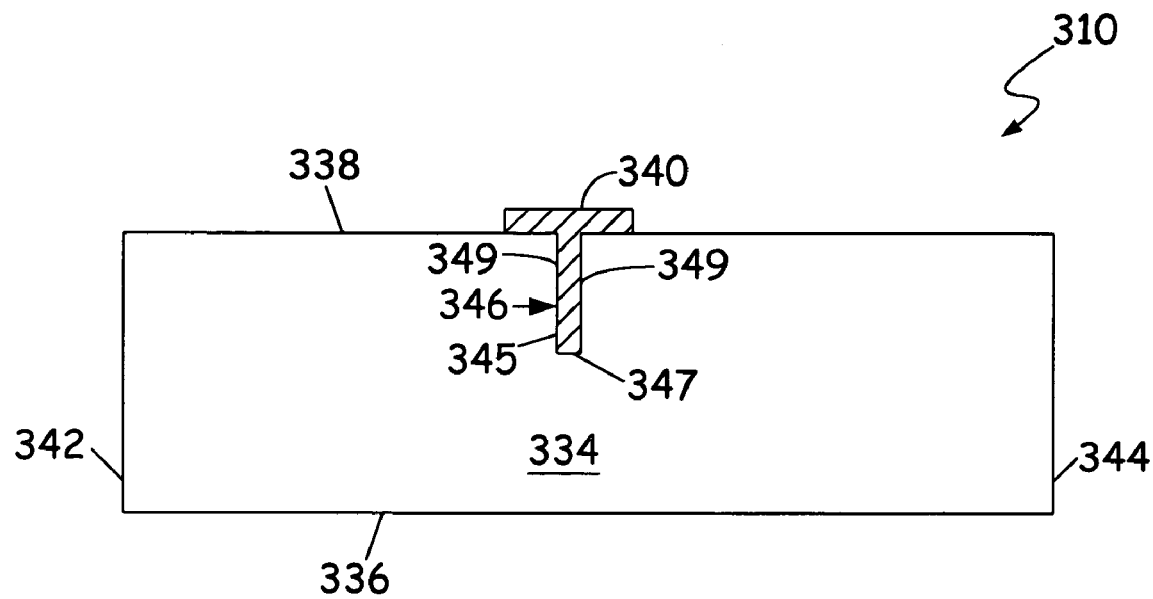

FIGS. 3-1 and 3-2 illustrate slider 310 in accordance with a first embodiment of the present invention. FIG. 3-1 is a top plan view of slider 310 prior to adhesive droplet 340 being deposited on mounting surface 338. FIG. 3-2 is a section view of slider 310, with portions cross-hatched, after adhesive droplet 340 has been deposited. As illustrated in FIGS. 3-1 and 3-2, slider 310 includes slider body 334, which has bearing surface 336, mounting surface 338, trailing edge 342 and leading edge 344. Slider body 334 also includes adhesive control feature 346 formed on mounting surface 338. Adhesive control feature 346 includes at least one reservoir 345. As shown in FIG. 3-1, reservoir 345 can be an elongated channel. Reservoir 345 includes bottom surface 347 and side surfaces 349. Adhesive control feature 346 is formed with slider body 334 using a photo process to remove portions of slider body 334. Those skilled in the art will recognize that other methods of forming feature 346 can be used as long as the method creates at least one reservoir 345 to increase the surface area of mounting surface 338.

FIG. 3-2 illustrates reservoir 345 centered under the deposited adhesive droplet 340 and configured to receive at least a portion of adhesive droplet 340 to reduce the effective size of adhesive droplet 340 deposited on slider body 334. The effective reduction in adhesive is achieved without the need to design or purchase new adhesive depositing equipment. The remaining portion of adhesive droplet 340 forms across a portion of mounting surface 338. In addition, feature 346 controls and prevents adhesive droplet 340 from spreading to the edges of slider body 334 such that the adhesive does not come into contact with sensitive areas on slider 310, such as the read/write transducers.

Figures 1, 4:
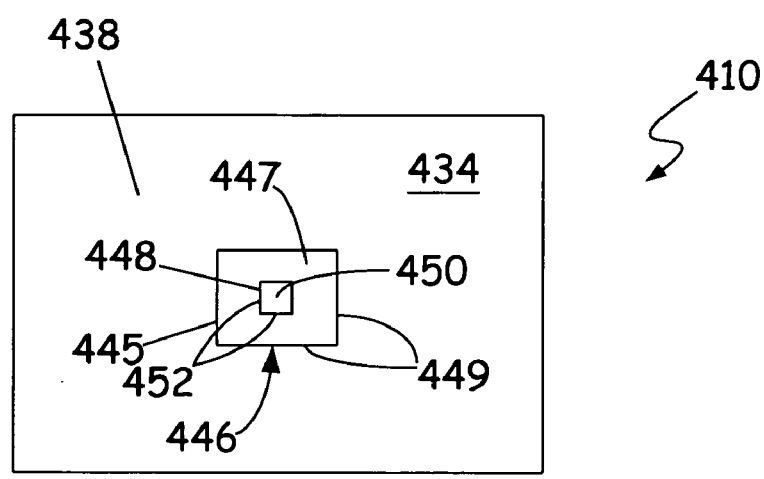
Figures 2, 4:
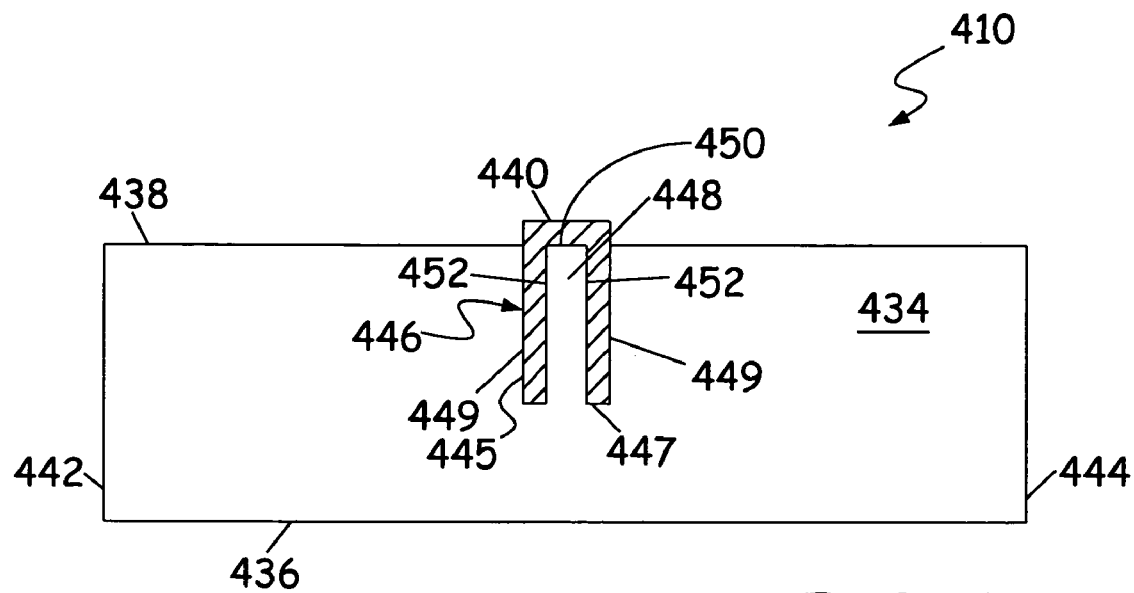

FIGS. 4-1 and 4-2 illustrate slider 410 in accordance with a second embodiment of the present invention. FIG. 4-1 is a top plan view of slider 410 prior to adhesive droplet 440 being deposited on mounting surface 438. FIG. 4-2 is a section view of slider 410, with portions cross-hatched, after adhesive droplet 440 has been deposited. Slider 410 includes slider body 434, which has bearing surface 436, mounting surface 438, trailing edge 442 and leading edge 444. Slider body 434 also includes adhesive control feature 446 formed on mounting surface 438. Adhesive control feature 446 includes at least one reservoir 445. Reservoir 445 has bottom surface 447 and side surfaces 449. Reservoir 445 includes at least one island 448 that protrudes from bottom surface 447 of reservoir 445 toward mounting surface 438. At least one island 448 includes top surface 450 and side surfaces 452. Side surfaces 452 of island 448 extend from bottom surface 447 of reservoir 445 to top surface 450. Top surface 450 is coplanar with mounting surface 438. Adhesive control feature 446 is formed with slider body 434 using a photo process to remove portions of slider body 434. Those skilled in the art will recognize that other methods of forming feature 446 can be used as long as the method creates at least one reservoir 445 having at least one island 448 to increase the surface area of mounting surface 438.

FIG. 4-2 illustrates at least one reservoir 445 and at least one island 448 centered under the deposited adhesive droplet 440 and configured to receive at least a portion of adhesive droplet 440 to reduce the effective size of adhesive droplet 440 deposited on slider body 434. The effective reduction in adhesive is achieved without the need to design or purchase new adhesive depositing equipment. The remaining portion of adhesive droplet 440 forms across a portion of mounting surface 438 and top surface 450 of island 448. In addition, feature 446 controls and prevents adhesive droplet 440 from spreading to the edges of slider body 434 such that the adhesive does not come into contact with sensitive areas on slider 410, such as the read/write transducers.

Figures 1, 5:
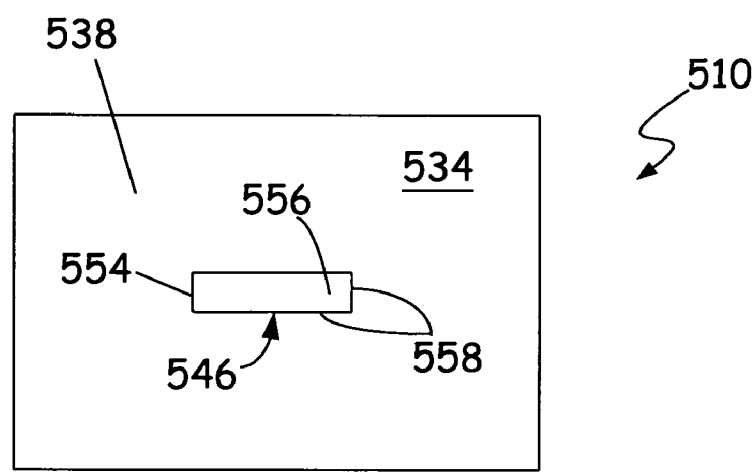
Figures 2, 5:
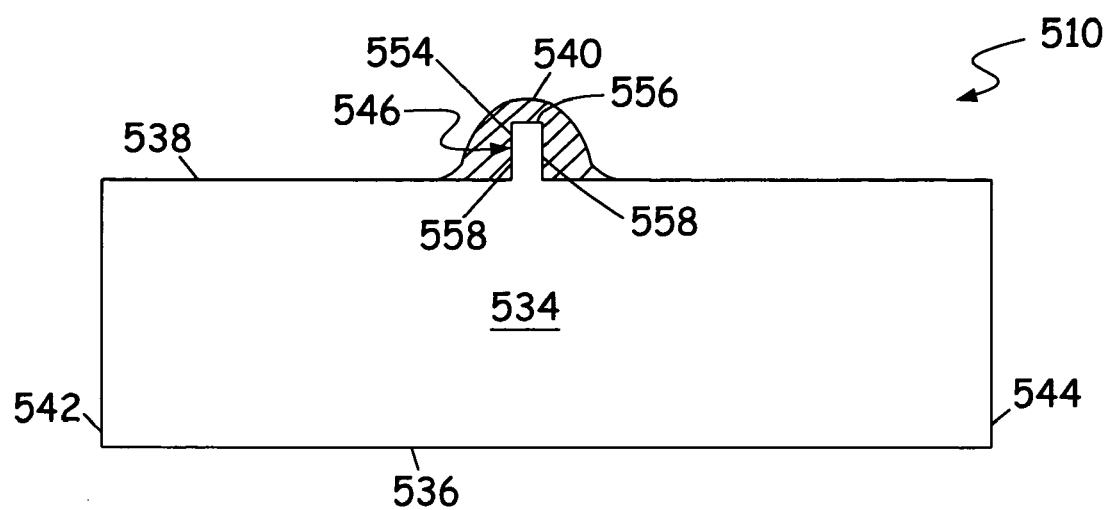

FIGS. 5-1 and 5-2 illustrate slider 510 in accordance with a third embodiment of the present invention. FIG. 5-1 is a top plan view of slider 510 prior to adhesive droplet 540 being deposited on mounting surface 538. FIG. 5-2 is a section view of slider 510, with portions cross-hatched, after adhesive droplet 540 has been deposited. Slider 510 includes slider body 534, which has bearing surface 536, mounting surface 538, trailing edge 542 and leading edge 544. Slider body 534 also includes an adhesive control feature 546 formed with slider body 534. Adhesive control feature 546 includes at least one pillar 554 that protrudes from mounting surface 538 of slider body 534. At least one pillar 554 includes top surface 556 and side surfaces 558. Side surfaces 558 of pillar 554 extend to top surface 556 in a direction generally away from bearing surface 536. Adhesive control feature 546 is formed with slider body 534 using a photo process to remove portions of slider body 534. Those skilled in the art will recognize that other methods of forming feature 546 can be used as long as the method creates at least one pillar 554 to increase the surface area of mounting surface 538.

FIG. 5-2 illustrates pillar 554 centered under adhesive droplet 540. The dispensed droplet 540 at least partially covers top surface 556 and side surfaces 558. The remaining portion of adhesive droplet 540 forms across a portion of mounting surface 538. Adhesive control feature 546 controls and prevents adhesive droplet 540 from spreading to the edges of slider body 534 such that the adhesive does not come into contact with sensitive areas on slider 510, such as the read/write transducers.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the system while maintaining substantially the same functionality without departing from the scope and spirit of the present invention. In addition, although the preferred embodiment described herein is directed to a slider for carrying transducers, it will be appreciated by those skilled in the art that the teachings of the present invention can be applied to other slider types, without departing from the scope and spirit of the present invention.

What is claimed is:

1. A slider for supporting at least one transducer, the slider comprising:
   a slider body having a bearing surface and an opposing mounting surface; and
   at least one reservoir formed in the slider body and extending from the mounting surface towards the bearing surface and has a bottom surface, a first pair of opposing side surfaces and a second pair of opposing side surfaces, the mounting surface and the at least one reservoir configured to receive an adhesive deposit.

2. The slider of claim 1, wherein the at least one reservoir comprises an elongated channel.

3. The slider of claim 1, wherein the at least one reservoir further comprises at least one island that protrudes from the bottom surface of the reservoir toward the mounting surface, each island having a top surface and side surfaces.

4. The slider of claim 3, wherein the side surfaces of the at least one island extend from the bottom surface of the reservoir to the top surface of the island such that the top surface of the island is coplanar with the mounting surface.

5. A slider for supporting at least one transducer, the slider comprising:
   a slider body having a bearing surface and an opposing mounting surface;
   at least one reservoir formed on the mounting surface of the slider body to receive a portion of adhesive for attaching the mounting surface to the actuation device, wherein the at least one reservoir has a bottom surface and side surfaces; and
   at least one island that protrudes from the bottom surface of each reservoir toward the mounting surface, each island having a top surface and side surfaces.

6. The slider of claim 5, wherein the at least one reservoir comprises an elongated channel.

7. The slider of claim 5, wherein the side surfaces of the at least one island extend from the bottom surface of the reservoir to the top surface of the island such that the top surface of the island is coplanar with the mounting surface.

8. The slider of claim 5, wherein a remaining portion of the adhesive forms across a portion of the mounting surface.

* * * * *